US005314222A

United States Patent [19]

Oehninger

[11] Patent Number: 5,314,222

[45] Date of Patent: * May 24, 1994

[54] VACUUM MANIPULATOR

[75] Inventor: Jean E. Oehninger, Yverdon-les-Bains, Switzerland

[73] Assignee: Cooper Industries, Inc., Houston, Tex.

[ * ] Notice: The portion of the term of this patent subsequent to Jul. 7, 2009 has been disclaimed.

[21] Appl. No.: 731,810

[22] Filed: Jul. 17, 1991

Related U.S. Application Data

[63] Continuation of Ser. No. 490,860, Mar. 9, 1990, abandoned, and a continuation-in-part of Ser. No. 733,063, Jul. 17, 1991, Pat. No. 5,127,694, which is a continuation of Ser. No. 491,411, Mar. 3, 1990, abandoned.

[30] Foreign Application Priority Data

Jun. 14, 1988 [CH] Switzerland ........ 02289/88

[51] Int. Cl.$^5$ ........ B25J 15/06; F16K 3/314; F16K 35/04

[52] U.S. Cl. ........ 294/64.1; 137/625.25; 251/176; 251/321

[58] Field of Search ........ 294/64.1-64.3; 15/419, 421; 137/625.25, 625.67; 251/145, 176, 297, 318-322, 347, 348; 604/119, 129

[56] References Cited

U.S. PATENT DOCUMENTS

| | | | |
|---|---|---|---|
| 2,777,462 | 1/1957 | Hohnstein | 251/297 X |
| 3,071,402 | 1/1963 | Lasto et al. | 137/625.25 |
| 3,455,533 | 7/1969 | Epp | 251/145 |
| 3,587,647 | 6/1971 | Walters | 137/625.25 |
| 3,674,236 | 7/1972 | Commarmot | 137/625.25 X |
| 3,834,388 | 9/1974 | Sauer | 15/421 X |
| 3,843,183 | 10/1974 | Hutson | 137/625.25 X |
| 3,940,172 | 2/1976 | Hutson et al. | 294/64.1 |
| 4,522,592 | 6/1985 | Johnson | 251/348 X |
| 4,618,178 | 10/1986 | Hutson et al. | 294/64.1 |
| 5,127,694 | 7/1992 | Oehninger | 294/64.1 |

FOREIGN PATENT DOCUMENTS

| | | | |
|---|---|---|---|
| 747404 | 4/1956 | United Kingdom | 137/625.25 |

*Primary Examiner*—Johnny D. Cherry
*Attorney, Agent, or Firm*—Nelson A. Blish; Eddie E. Scott

[57] ABSTRACT

A vacuum manipulator, comprising an elongated body with two segments of longitudinal ducts one of which opens at one end for connection to a suction source and the other one of which is adapted to be fitted with a suction nozzle, openings communicating the duct segments with a longitudinal guide channel, a spool valve mounted for longitudinal sliding in the guide channel, the bottom of the channel being flat with the face of the spool valve adjacent to the bottom having three contact zones for elevating the face relative to the bottom, one of the contact zones being central and being formed by a support wall which defines a generally enclosed area, the other two of the zones being located at opposite ends of the spool valve, a piston having an endless wall defining an enclosed space and being mounted for sliding engagement with the bottom of the guide channel for selective communication with the openings, a spring operable with the piston to urge the endless wall of the piston in generally sealing engagement against the bottom of the guide channel.

8 Claims, 2 Drawing Sheets

VACUUM MANIPULATOR

The present application is a continuation of application Ser. No. 490,860 filed Mar. 9, 1990 (now abandoned) and is a continuation in part of patent application Ser. No. 733,063 filed Jul. 17, 1991, now U.S. Pat. No. 5,127,594, and which in turn is a continuation of patent application Ser. No. 491,411 filed Mar. 3, 1990 (now abandoned).

SUMMARY BACKGROUND OF THE INVENTION

The present invention concerns a vacuum manipulator comprising an elongated body with two segments of longitudinal ducts, one of which opens at one end of said body and is intended to be connected to a suction source and the other one of which is intended to be fitted with a suction nozzle. The internal ends of these duct segments communicate laterally via respective holes with the bottom of the longitudinal guide channel which constitutes the seat of a spool valve mounted in a longitudinal fashion and sliding in this guide channel, The U.S. Pat. No. 3,843,183 already describes such an instrument equipped with a sliding spool valve. The problem which exists with such a valve is that of the air tightness existing between the bottom of the guide channel which constitutes the seat of the valve and the surface of this valve in contact with this valve. When a vacuum is applied at the level of the hole which puts the seat of the valve in communication with the suction source, the valve is applied against said seat with a force corresponding to the vacuum. Of course, the specific pressure is all the higher than the bearing surface is smaller; a lower limit should not, however, be exceeded to avoid the development of leaks. Furthermore, the length and the width of the valve should be sufficient to ensure the guide and stability of this sliding part. For reasons of weight and price, the body of this instrument as well as the spool valve are preferably made out of molded plastic. It results from these various data that it is practically extremely difficult, if not impossible to manufacture a valve long and wide enough and to obtain simultaneously a good airtightness between said valve and its seat, the specific pressure being too low and it being impossible to ensure a perfect contact over the whole surface especially with plastic parts.

The goal of this invention is to remedy, partly at least, the hereabove-mentioned disadvantages by ensuring at once a good guide function and a good air tightness of the spool valve.

The instrument, according to the invention, is of a simple construction, of a reliable operation and an easy manipulation. Many other advantages will appear during the description accompanying the appended drawing which illustrates, schematically and as an example, a form of execution of the instrument which is the object of the present invention.

Other objects, features, and advantages of the present invention will become apparent from the subsequent description and the appended claims, taken in conjunction with the accompanying drawings, in which:

Figure 1:
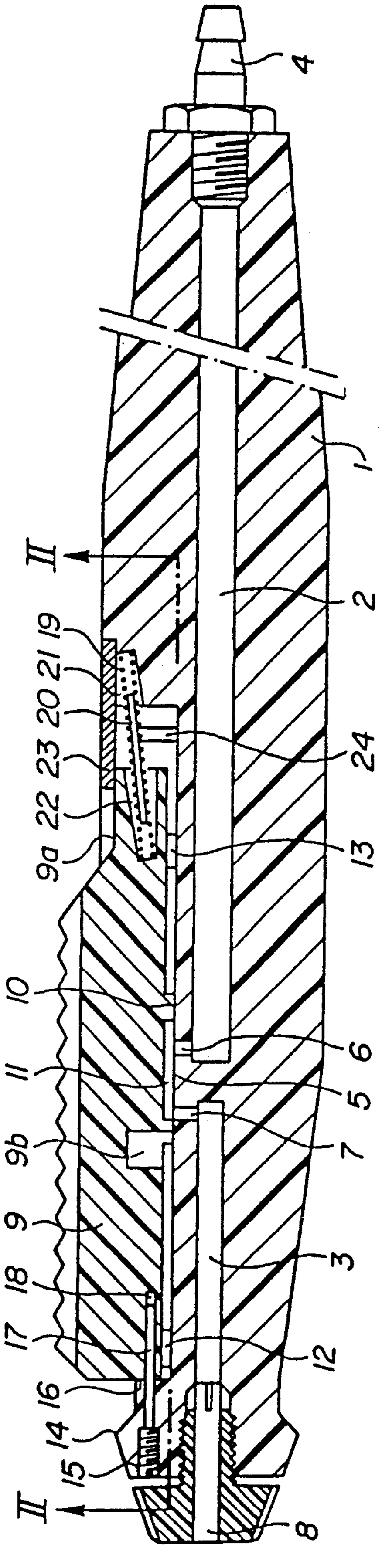
FIG. 1 is an axial cross-sectional view of one form of vacuum manipulator of the present invention and having a spool valve shown in its actuated position.

This instrument is comprised of an elongated body 1 constituted by a molded plastic part, which presents to segments of axial ducts 2 and 3. The duct segment 2 opens on the back end of the body 1 of the instrument and is equipped with a connection nozzle 4 intended to receive a flexible hose linking duct segment 2 to a section source (not illustrated). The other end of this segment is placed in communication with the flat bottom of a guide channel 5 via a hole 6. The internal end of the other duct segment 3 is also put in communication with the flat bottom of this guide channel 5 by means of a hole 7, while its other end opens on the front part of the body 1 of the instrument and is equipped with a clamping chuck 8 intended for the movable fitting of a diversity of tubular suction nozzles (not illustrated).

A spool valve 9 in the shape of a slide is mounted in a sliding fashion in the guide channel 5. It has on its lower face adjacent to the bottom of the guide channel 5, which constitutes the seat of this valve 9, three distinct zones, elevated in relation to this face. They are: a central zone 10 in the shape of an endless wall creating an enclosed space 11 constituting the spool of this valve 9, and two zones 12 and 13 placed close to the ends of this valve, to prevent the tilting of valve 9 around the central elevated zone 10. Each of the elevated zones 12, 13 is divided into two parts which create between themselves a communication hole with the outside atmosphere. A blind hole **9*b* is pierced in the valve 9 in part on the front edge of the elevated wall 10**.

A ring-shaped boss 14 is formed around the front end of the body 1 of the instrument and serves as a front bearing surface for the fingers of the user of the instrument. A drilled hole 15 whose front part is threaded crosses this boss 14 in a fashion parallel to the axis of the body 1 and opens in a span 16 formed by the front end of the guide channel 5. A rod 17 with a threaded end engaged in this drilling 15 penetrates into a corresponding drilling 18 which exists in the front end of valve 9. The threaded part of this rod 17 is screwed into the threaded part of drilling 15.

A spring 19 mounted on a rod 20 shorter than it is lodged in part in a clearance space 21 left at the back end of the channel 5 and in an enclosure 22 opening at the back end of valve 9. A plate 23 fixed by means of a screw (not illustrated) on body 1, covers the back end of channel 5. The back end of valve 9 ends in a part of reduced height **9*a* which can slide under plate 23**.

The rod 17 and plate 23 are used to keep the spool valve 9 in the channel 5 in the absence of vacuum. The plate 23 serves also to keep spring 19 in clearance space 21.

Figure 2:
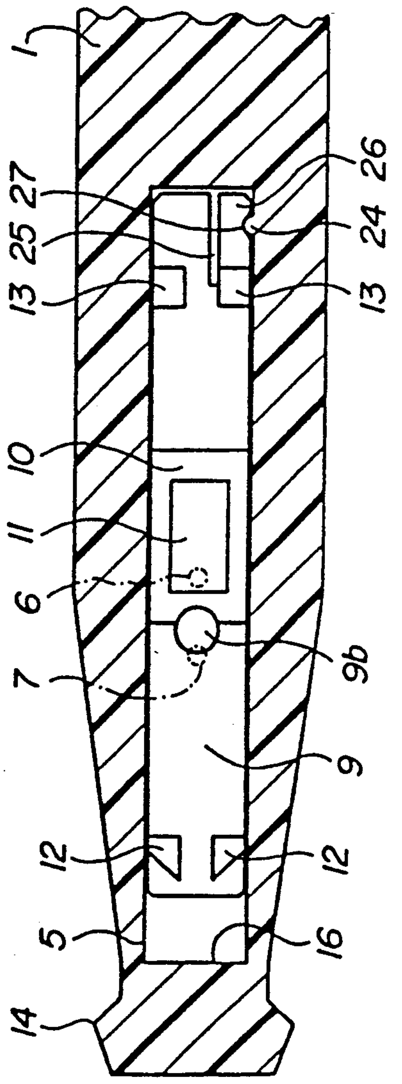
FIG. 2 is a cross-sectional view of FIG. 1, taken generally in the direction of the arrows II—II in FIG. 1 and depicting the spool valve in a stored non-actuated position.

As can be seen in particular in FIG. 1, a vertical stop is formed by a ribbing 24 which protrudes from one of the side walls of the guide channel 5. FIG. 2 shows the spool valve from underneath. It can be seen on this figure that a slot 25 extends longitudinally at the end of the spool valve 9. This slot 25 is not located in the middle of the width of valve 9, so as to form an elastic arm 26. This arm 26 has a notch 27 intended to engage in groove 24. The corner formed at the free end of this arm 26, which is adjacent to the side wall of the guide channel 5, is slightly chamfered whereas the ribbing 24 is semi-cylindrical in section so that the force exerted on valve 9 to push it towards the back is transformed into a force with a transversal component which applies itself on the elastic arm 26 when the back end of the valve 9 meets with stop 24, allowing thus to engage notch 27 on ribbing 24, when a sufficient force is applied on the spool valve 9.

In the position illustrated by FIG. 1, the spool valve 9 is pushed against span 16, limiting the guide channel towards the front by means of the spring 19. As may be observed on this FIG. 1, the enclosed space 11 created inside the endless wall forming the central elevated zone 10 place in communication holes 6 and 7 and consequently, the source of suction connected to the duct segment 2 with the duct segment 3. As a consequence, the nozzle which will be fastened to the front part of the body 1 in the clamping chuck 8 will be subjected to a vacuum and will be able to seize electronics, electrical or small mechanical parts or components, for instance.

When the part or component thus seized is brought to the proper location for mounting or fastening, the user holding the body of the instrument as he would a pencil with the forefinger placed on the notched upper surface of the valve 9 moves the latter in its guide channel 5 until its back end meets with ribbing 24. As it passes from the forward position to the back position, unstable and bearing elastically against ribbing 24, the hole 7 goes from the inside 11 of the zone 10 to the outside in front of the blind hole 9*b* whose role is essentially to decrease the travel required of valve 9 to go from one to the other position by reducing only locally and progressively the thickness of the wall of zone 10 surrounding space 11. In this second position, the duct segment 3 is immediately placed at the atmospheric pressure, liberating thus the part or component which was being held by the vacuum.

In order to go and seize another part, it is only necessary to free the spool valve 9 which is automatically returned against span 16 by spring 19, re-establishing thus the vacuum in the duct segment 3.

During prolonged interruption in the use of this instrument, one only needs to apply on valve 9, which is resting against ribbing 24, a force capable of flexing elastically the arm 26 in order to bring the groove 27 in connection with the ribbing 24, maintaining thus the hole 6 of the duct segment 2 in the closed space 11 of the spool 9 and separated from the hole 7 which remains in communication with the atmosphere.

One notices the very great simplicity on the activating mechanism of this instrument as well as the low number of parts which reduces the assembly cost. The main parts, the body 1 and the slide of the spool 9 are obtained essentially by molding plastic. The tests carried out have shown that it was possible to obtain at the exit of the instrument a vacuum in excess of 80% of that of the suction source. The operation is silent. Only one finger is used to shift via a simple sliding motion the spool valve 9 between three distinct positions, which makes this instrument very easy to operate.

Figure 3:
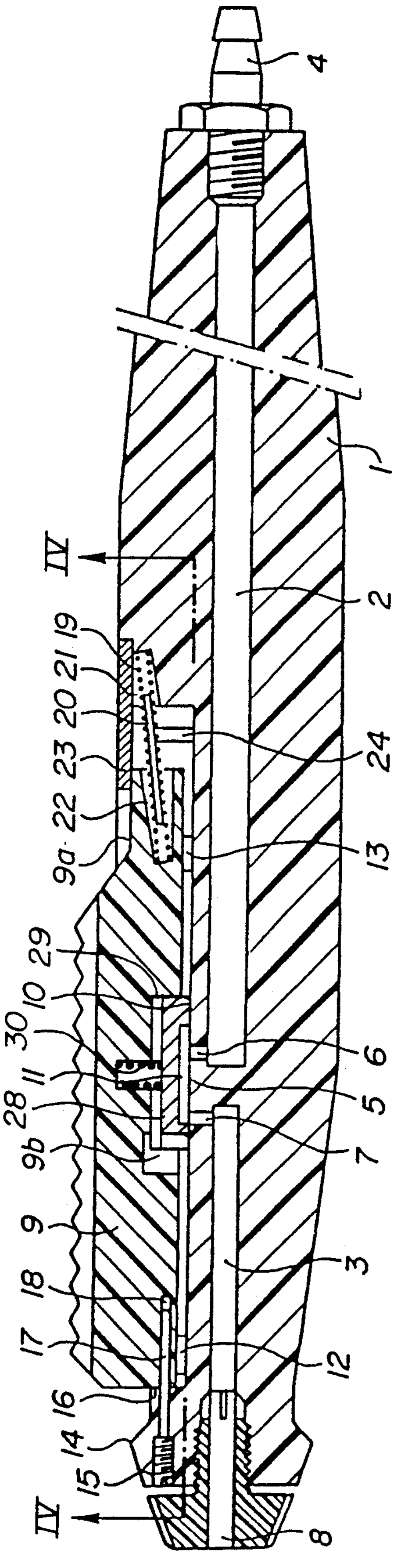
FIG. 3 is an axial cross-sectional view similar to FIG. 1 but depicting a modified form of the invention of FIG. 1.
Figure 4:
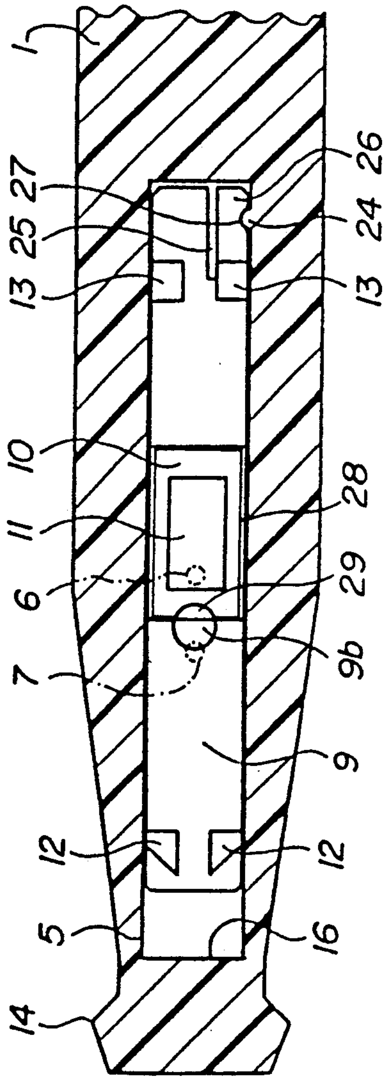
FIG. 4 is a cross sectional view of the embodiment of FIG. 3 taken generally in the direction of the arrows IV—IV in FIG. 3 and depicting the spool valve in the stored non-actuated position.

In the version illustrated by FIGS. 3 and 4, only spool valve 9 has been modified, so that the other parts of the instrument which have not undergone any alteration will not be described again. They are furthermore designated by the same reference numbers and one may refer to the description which precedes for the parts of this version designated by these same reference numbers.

The variation concerns essentially the fact that the central zone 10 which is an endless wall creating an enclosed space 11 is no longer originating from a molding with valve 9, but is connected to a piston 28 mounted in a sliding fashion in a housing 29 created in this valve 9. This housing 29 defines a sliding axis of piston 28 which is perpendicular with the bottom of the guide channel 5. A spring 30 is compressed between the bottom of this housing 29 and this piston 28 in order to apply elastically the endless wall of zone 10 constituting the spool against the seat constituted by the bottom of the guide channel 5. Because of the pressure exerted by the spring 30 between the piston 28 and the bottom of the housing 29, the slide of the spool valve 9 is applied against the plate 23 and against the rod 17, so that in the absence of any manual solicitation on this slide, the elevated zones 12, 13 do not push against the bottom of the channel 5.

The advantage of this variation is to ensure that there is a better contact between the endless wall of zone 10 and the seat constituted by the bottom of guide channel 5, ensuring more easily a good airtightness of the space 11 with the outside than in the form of execution of FIGS. 1 and 2, where said airtightness is dependent upon a simultaneous contact of the prominent surfaces of zones 10, 12 and 13. Furthermore, the pressure applied by the spring 30 on the piston 28 is added to the vacuum created in space 11, increasing thus the force which applies the endless wall of zone 10 against the bottom of guide channel 5.

I claim:

1. A vacuum manipulator, comprising an elongated body with two duct segments of longitudinal ducts one of which opens at one end of said elongated body for connection to a suction source and the other one of which is adapted to be fitted with a suction nozzle, the internal ends of said duct segments communicating laterally via respective communication holes with the bottom of a longitudinal guide channel, a spool valve, said bottom of said guide channel defining a seat for said spool valve, said spool valve mounted for sliding longitudinally in said guide channel, said bottom of said guide channel being flat with the face of said spool valve adjacent to said bottom having three contact zones with said bottom for spacing said face relative to said bottom, one of said contact zones being a central contact zone, the other two of said contact zones being located at opposite ends of said spool valve, said spool value including a valve body and a piston supported in said valve body at said central contact zone and operatively connected for longitudinal movement with said spool valve, said piston having an endless wall defining an enclosed space and being mounted for transverse movement relative to said valve body and for sliding engagement with said bottom of said guide channel for selective communication with said communication holes, pressure means actuable with said piston to urge said piston transversely from said valve body with said endless wall of said piston in generally sealing engagement against said bottom of said guide channel.

2. A vacuum manipulator comprising an elongated body having two duct segments of longitudinal ducts one of which opens at one end of said body and is adapted to be connected to a suction source and the other one of which is adapted to be fitted with a suction nozzle with the internal ends of said duct segments communicating laterally via respective openings with a bottom surface of a longitudinal guide channel, a spool valve adapted for reciprocal, longitudinal movement in said elongated body, said spool valve including a valve body, said bottom surface of said guide channel constituting a seat for said valve body, said spool valve being mounted for sliding longitudinally in said guide channel, said bottom surface of said guide channel being generally flat, the face of said valve body adjacent to said bottom surface having contact zones whereby said bottom surface of said guide channel is spaced relative to said face of said valve body, said contact zones comprising a support wall structure, said spool valve including a piston member, said piston member being supported in said valve body for longitudinal movement with said spool valve, said piston member being mounted for transverse movement relative to said valve body and having an endless wall defining an enclosed area, said valve body including contact means operative at said contact zones for supporting said valve body in said guide channel independently from said piston member, said piston member operatively connected with said support wall structure for movement therein transversely towards said bottom surface, guide means operatively connected with said elongated body and located adjacent the ends of said spool valve and including guide members for guidingly securing said spool valve in said guide channel, said piston member being mounted in said support wall structure for sliding engagement with said bottom surface of said guide channel with said endless wall being in selective communication with said openings, said support wall structure defining an axis for said piston member extending generally perpendicularly with said bottom surface of said guide channel, and pressure means being operably associated with said piston member to elastically urge said endless wall of said piston member in generally sealing engagement against said bottom surface of said guide channel, said valve body being urged against said guide members by said pressure means.

3. A vacuum manipulator according to claim 2, wherein said guide members include a guide rod and a retaining plate, said guide rod extending longitudinally at one end of said channel and said retaining plate located over a portion of said channel, said guide rod and said retaining plate guidingly confining said spool valve in said channel.

4. A vacuum manipulator comprising an elongated body having two duct segments of longitudinal ducts one of which opens at one end of said elongated body and is adapted to be connected to a suction source and the other one of which is adapted to be fitted with a suction nozzle whereby the internal ends of said duct segments communicate laterally via respective openings with a bottom surface of a longitudinal guide channel, a spool valve adapted for reciprocal, longitudinal movement in said elongated body, said spool valve including a valve body, said bottom surface of said guide channel constituting a seat for said valve body, said spool valve being mounted for sliding longitudinally in said guide channel relative to said bottom surface, said valve body having a face in confrontation with said bottom surface, said valve body having contact zones associated with said face and comprising a support wall, said spool valve including a piston member supported in said valve body for longitudinal movement with said spool valve and operatively connected with said support wall for transverse, reciprocal movement therein, said piston member having an endless wall defining an enclosed area, said valve body including contact means operative at said contact zones for supporting said valve body in said guide channel independently from said piston member, guide means operatively connected with said elongated body for guidingly securing said valve body in said guide channel with said enclosed area being in selective communication with said openings, said piston member being mounted for sliding engagement with said bottom surface of said guide channel, said support wall defining an axis for said piston member extending generally perpendicularly with said bottom surface of said guide channel, and bias means being operably associated with said piston member and said valve body to elastically urge said piston member towards said bottom surface with said endless wall of said piston member in generally sealing engagement against said bottom surface of said guide channel.

5. A manually operable vacuum manipulator operable from a source of vacuum for picking up selected objects with vacuum, said manipulator comprising an elongated body with two segments of longitudinal ducts, one of which opens at one end of said body for connection to the vacuum source and the other one of which is adapted to be fitted with a suction nozzle, passage means communicating said duct segments with the bottom surface of a longitudinal guide channel, a spool valve slidably mounted in said longitudinal guide channel, said bottom surface of said guide channel defining a seat for said spool valve, said spool valve having a face in confrontation with said bottom surface, said spool valve having contact zones for locating said face in spaced relationship to said bottom surface of said channel, one of said contact zones being formed by an endless wall which defines an enclosed space with said endless wall adapted to sealingly engage said bottom surface, said spool valve being slidingly movable in a first direction with said passage means connecting said duct segments together to the vacuum source and hence placing a vacuum at said suction nozzle, said spool valve being slidingly movable in a second direction with said passage means interrupting communication between said duct segments and blocking communication of said one duct segment to atmosphere while connecting said other duct segment and hence said nozzle to atmosphere, and a first means for biasing said spool valve in said first direction towards a pickup position for picking up the selected objects by the vacuum at said nozzle, and a second means for selectively preventing said first means from sliding said spool valve in said first direction to the pickup position.

6. The vacuum manipulator of claim 5 with said spool valve comprising a piston member having said endless wall, and bias means being operably associated with said piston member to urge said endless wall of said piston member in generally sealing engagement against said bottom surface of said guide channel.

7. The vacuum manipulator of claim 5 with said spool valve comprising a piston member having said endless wall, and bias means being operably associated with said piston member to urge said endless wall of said piston member in generally sealing engagement against said bottom surface of said guide channel, guide means operatively connected with said spool valve for guidingly retaining said spool valve in said guide channel, said spool valve being urged against said guide means by said bias means.

8. The vacuum manipulator of claim 5 with said spool valve comprising a piston member having said endless wall, and bias means being operably associated with said piston member to urge said endless wall of said piston member in generally sealing engagement against said bottom surface of said guide channel, guide means operatively connected with said spool valve for guidingly retaining said spool valve in said guide channel, said spool valve being urged against said guide means by said bias means, said guide means including a guide rod and a retaining plate, said guide rod extending longitudinally at one end of said channel and said retaining plate located over a portion of said channel, said guide rod and said retaining plate guidingly confining said spool valve in said channel.

* * * * *